US012669610B2

(12) United States Patent
Raz et al.

(10) Patent No.: US 12,669,610 B2
(45) Date of Patent: Jun. 30, 2026

(54) SYSTEMS, DEVICES AND METHODS FOR MICRO-VIBRATION DATA EXTRACTION USING A TIME OF FLIGHT (ToF) IMAGING DEVICE

(71) Applicant: Gentex Corporation, Zeeland, MI (US)

(72) Inventors: Guy Raz, Binyamina (IL); Yuval Gronau, Ramat Hasharon (IL)

(73) Assignee: GENTEX CORPORATION, Zeeland, MI (US)

( * ) Notice: Subject to any disclaimer, the term of this patent is extended or adjusted under 35 U.S.C. 154(b) by 1140 days.

(21) Appl. No.: 17/298,996

(22) PCT Filed: Dec. 1, 2019

(86) PCT No.: PCT/IL2019/051317
§ 371 (c)(1),
(2) Date: Jun. 2, 2021

(87) PCT Pub. No.: WO2020/115737
PCT Pub. Date: Jun. 11, 2020

(65) Prior Publication Data
US 2021/0341620 A1 Nov. 4, 2021

Related U.S. Application Data

(60) Provisional application No. 62/774,255, filed on Dec. 2, 2018.

(51) Int. Cl.
*G01S 17/894* (2020.01)
*B60Q 3/20* (2017.01)
(Continued)

(52) U.S. Cl.
CPC ............. *G01S 17/894* (2020.01); *B60Q 3/20* (2017.02); *G01B 11/22* (2013.01); *G01H 9/00* (2013.01);
(Continued)

(58) Field of Classification Search
CPC ................................. G01B 11/25; G01H 9/00
See application file for complete search history.

(56) References Cited

U.S. PATENT DOCUMENTS

| | | | |
|---|---|---|---|
| 9,760,837 B1 | 9/2017 | Nowozin et al. | |
| 2011/0025827 A1 | 2/2011 | Shpunt et al. | |

(Continued)

FOREIGN PATENT DOCUMENTS

| | | | | |
|---|---|---|---|---|
| CN | 107704808 A | 2/2018 | | |
| WO | 2014033157 | 3/2014 | | |
| WO | WO-2014033157 A1 * | 3/2014 | ............. | G01B 11/14 |

OTHER PUBLICATIONS

PCT International Search Report for International Application No. PCT/IL2019/051317, mailed Mar. 19, 2020, 3pp.
(Continued)

*Primary Examiner* — Helal A Algahaim
*Assistant Examiner* — Clara G Chilton
(74) *Attorney, Agent, or Firm* — Price Heneveld LLP; Brian James Brewer

(57) ABSTRACT

System and methods are provided for detecting vibrations of one or more object in a scene comprising at least one illumination source configured to project light in a structured light pattern on the scene; a Time-of-Flight (ToF) imaging device comprising: an illumination source configured to project modulated light into the scene, a ToF sensor, configured to capture a plurality of images comprising reflections of the modulated light, the structured light pattern from the one or more objects in the scene and ambient light images of one or more objects in the scene; and at least one processor configured to: extract depth data of said one or more objects by analyzing the plurality of images and analyze one or more changes in one or more speckle patterns of at least one of the reflections of said structured light pattern in at least some consecutive images of the plurality
(Continued)

of images; and identify the vibrations of the at least one object based on said speckle pattern analysis and said depth data.

20 Claims, 8 Drawing Sheets

(51) Int. Cl.

| | |
|---|---|
| *G01B 11/22* | (2006.01) |
| *G01H 9/00* | (2006.01) |
| *G01S 7/481* | (2006.01) |
| *G01S 7/4915* | (2020.01) |

(52) U.S. Cl.
CPC .......... *G01S 7/4814* (2013.01); *G01S 7/4816* (2013.01); *G01S 7/4915* (2013.01); *B60Q 2400/20* (2013.01)

(56) References Cited

U.S. PATENT DOCUMENTS

| | | | |
|---|---|---|---|
| 2011/0248151 A1* | 10/2011 | Holcombe | .............. G01S 17/46 |
| | | | 250/221 |
| 2012/0268372 A1 | 10/2012 | Park et al. | |
| 2013/0144137 A1 | 6/2013 | Zalevsky et al. | |
| 2013/0201324 A1* | 8/2013 | Cardoso | .................... G06T 7/44 |
| | | | 348/135 |
| 2015/0176948 A1 | 6/2015 | Varshneya et al. | |
| 2015/0345906 A1* | 12/2015 | Varshneya | .............. F41G 3/165 |
| | | | 235/404 |
| 2018/0266876 A1* | 9/2018 | Carmon | ............... G02B 27/106 |
| 2020/0202103 A1* | 6/2020 | Tang | .................... G06V 40/197 |
| 2020/0379102 A1* | 12/2020 | Kosowsky | .............. G01S 7/412 |

OTHER PUBLICATIONS

PCT Written Opinion for International Application No. PCT/IL2019/051317, mailed Mar. 19, 2020, 17pp.

* cited by examiner

200

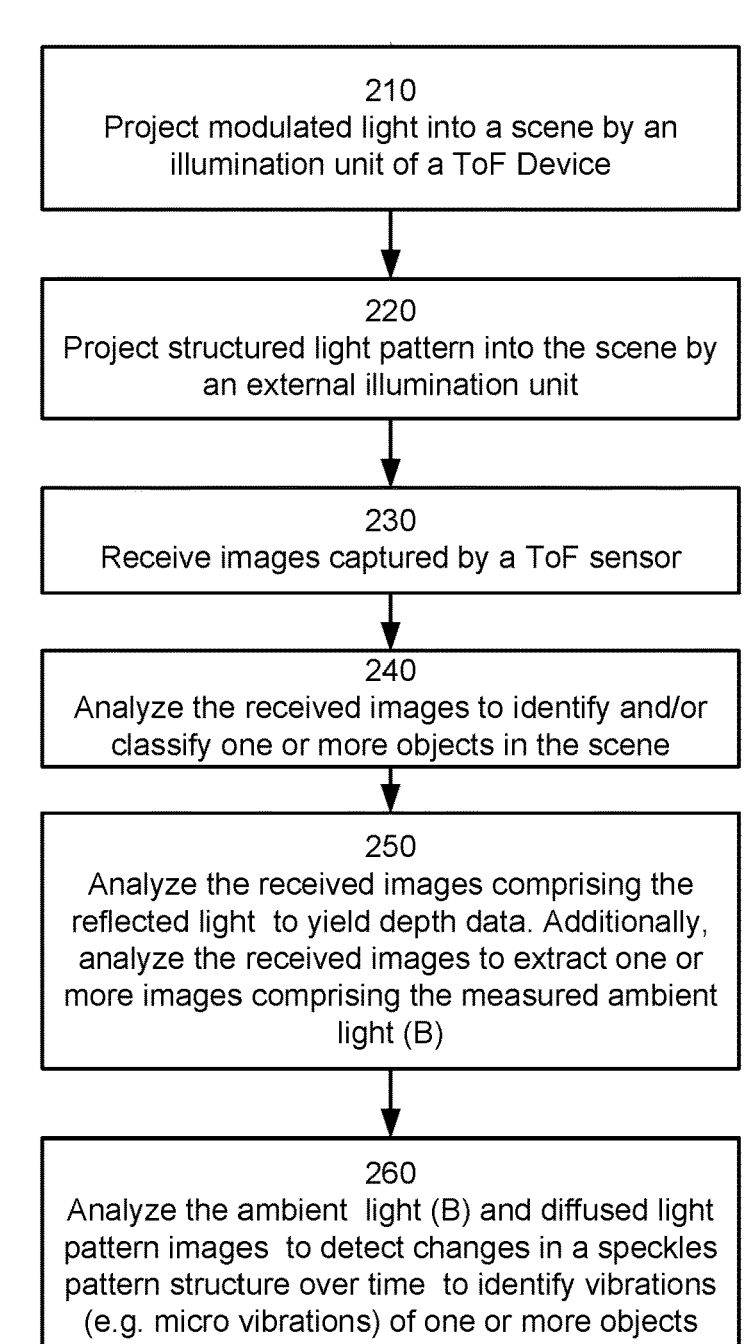

210
Project modulated light into a scene by an
illumination unit of a ToF Device 220
Project structured light pattern into the scene by
an external illumination unit 230
Receive images captured by a ToF sensor 240
Analyze the received images to identify and/or
classify one or more objects in the scene 250
Analyze the received images comprising the
reflected light  to yield depth data. Additionally,
analyze the received images to extract one or
more images comprising the measured ambient
light (B)

260
Analyze the ambient  light (B) and diffused light
pattern images  to detect changes in a speckles
pattern structure over time  to identify vibrations
(e.g. micro vibrations) of one or more objects

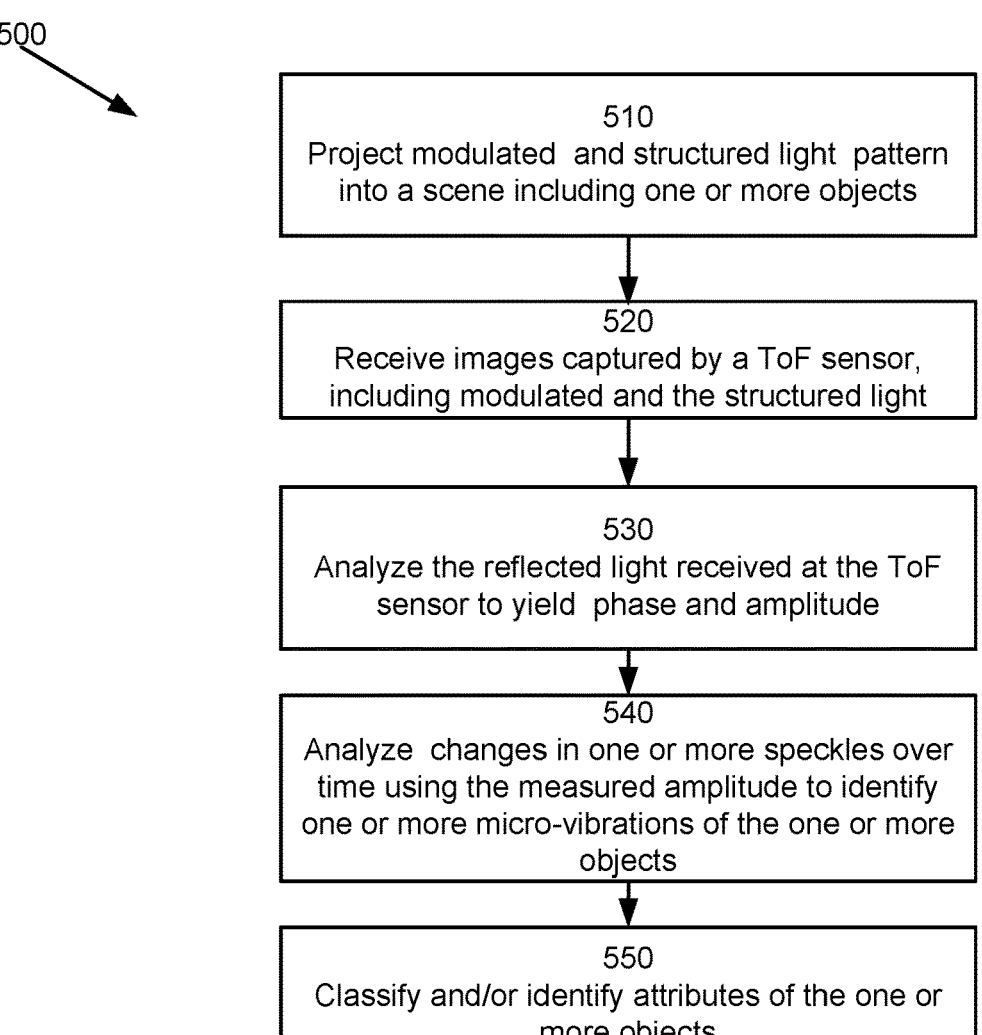

510
Project modulated and structured light pattern into a scene including one or more objects 520
Receive images captured by a ToF sensor, including modulated and the structured light 530
Analyze the reflected light received at the ToF sensor to yield phase and amplitude 540
Analyze changes in one or more speckles over time using the measured amplitude to identify one or more micro-vibrations of the one or more objects 550
Classify and/or identify attributes of the one or more objects

FIGURE 5

SYSTEMS, DEVICES AND METHODS FOR MICRO-VIBRATION DATA EXTRACTION USING A TIME OF FLIGHT (ToF) IMAGING DEVICE

CROSS-REFERENCE

The present application is a National Phase of PCT Patent Application No. PCT/IL2019/051317 having International filing date of Dec. 1, 2019, which claims priority to U.S. Provisional Application Ser. No. 62/774,255 filed on Dec. 2, 2018, entitled "SYSTEMS, DEVICES AND METHODS FOR MICRO-VIBRATION DATA EXTRACTION USING A TIME OF FLIGHT (ToF) IMAGING DEVICE" which are all incorporated herein by reference in their entirety.

INCORPORATION BY REFERENCE

All publications, patents, and patent applications mentioned in this specification are herein incorporated by reference to the same extent as if each individual publication, patent, or patent application was specifically and individually indicated to be incorporated by reference.

TECHNICAL FIELD

The present invention, in some embodiments thereof, relates to analyzing images captured by an imaging device to detect objects in a scene, and, more specifically, but not exclusively, analyzing images captured by a Time-of-Flight (ToF) imaging device to detect objects in the scene including motion and micro-vibrations thereof.

BACKGROUND OF THE INVENTION

Object and people detection including motion and/or micro-vibrations detection is a highly challenging task and a lot of research is therefore invested by many stakeholders to develop and deploy tools, algorithms, and methods for accurately detecting and classifying objects present in a scene.

Automated object detection methods and systems are attracting a continuously growing attention as they may be applied for a plurality of systems, services and/or applications ranging from commercial applications, entertainment applications to automated and/or autonomous vehicles and many more.

Although prior imaging and detection devices and methods have been proposed. The prior imaging devices are large and bulky including for example multiple imaging devices that must be operated simultaneously and as a result can have less than ideal resolution, sensitivity, and less accuracy than would be ideal due to complex cross-talk and calibration issues.

In light of the above, an improved sensing and detection device that overcomes at least some of the above mentioned deficiencies of the prior detection would be beneficial. Ideally, such a device would be compact, integrated with other devices and systems such as a vehicle, sufficiently rugged and low in cost to be practical for end-user sensing of objects, convenient and convenient to use.

SUMMARY OF THE INVENTION

The present disclosure provides system, device and methods of improved vibrations detection and classification. According to a first embodiment, there is provided a system for detecting vibrations of one or more objects in a scene, the system comprising: at least one illumination source configured to project light in a structured light pattern on the scene; a Time-of-Flight (ToF) imaging device comprising: an illumination source configured to project modulated light into the scene; a ToF sensor, said ToF sensor is configured to: capture a plurality of images, said plurality of images comprising reflections of the modulated light and the structured light pattern from the one or more objects in the scene and ambient light images of one or more objects in the scene; and at least one processor configured to: extract depth data of said one or more objects by analyzing the plurality of images; analyze one or more changes in one or more speckle patterns of at least one of the reflections of said structured light pattern in at least some consecutive images of the plurality of images; and identify the vibrations of the one or more objects based on said speckle pattern analysis and said depth data.

In an embodiment, said depth data is extracted by measuring the phase difference between the projected and reflected modulated light and further analyze the plurality of images to extract the ambient illumination images of said scene and wherein said ambient illumination images are used to analyze one or more changes in the speckle pattern of at least one of the plurality of reflected diffused light elements in at least some consecutive images of the plurality of images.

In an embodiment, said depth data, said ambient light images and said detected vibrations are obtained and detected simultaneously.

In an embodiment, said illumination source is a laser or LED (Light Emitting Diode).

In an embodiment, said at least one illumination source is a single mode laser source, comprising a beam splitter for projecting a multi-beam pattern onto the scene.

In an embodiment, said beam splitter comprises one or more of optical elements for splitting said beam, said optical elements are selected from the group comprising of: DOE, split mirrors, diffuser.

In an embodiment, the system comprising a single illumination source configured to project the modulated light in the structured light pattern.

In an embodiment, the at least one processor is configured to: measure the phase and amplitude of the reflected modulated structured light pattern to yield an illumination intensity of said one or more speckle patterns; analyze the phase to extract depth data of the scene; and analyze, on said measured illumination intensity, the one or more changes in the speckle pattern of at least one of the plurality of reflected diffused light elements in at least some consecutive images of the plurality of images; identify at least one micro-vibration of the one or more objects based on said speckle pattern analysis and said measured illumination intensity.

In an embodiment, the processor is further configured to: classify or identify attributes of the one or more objects based on said identified at least one micro-vibration.

In an embodiment, the processor is further configured to: classify the least one or more objects present in the scene by visually analyzing at least one image of the plurality of images.

In an embodiment, the visual analysis comprises using at least one trained machine learning model for classifying the one or more objects.

In an embodiment, wherein the processor is being capable of identifying a human based on said vibration information.

In an embodiment, the light pattern is selected from a group consisting of: a dot, a spot, a line and a combination thereof.

In an embodiment, the ToF sensor includes a photodiode or photodiode array and each speckles field is mapped to 1-100 pixels of said ToF sensor.

In an embodiment, the system is configured for mounting inside a vehicle.

According to a second embodiment there is provided a system for detecting vibrations of one or more objects in a scene, the system comprising: a single illumination source configured to project a modulated and structured light pattern on the scene such as a predefined light pattern on the scene; a Time-of-Flight (ToF) imaging device comprising: a ToF sensor, said ToF sensor is configured to: capture a plurality of images, said plurality of images comprising reflections of said modulated and structured light pattern from one or more objects in the scene; and at least one processor configured to: extract depth data of said one or more objects by analyzing the reflections of said structured light pattern; analyze one or more changes in one or more speckle patterns of at least one of the reflections of said structured light pattern in at least some consecutive images of the plurality of images; and identify the vibrations of the at least one object based on said speckle pattern analysis and said depth data.

In an embodiment, the depth data is extracted by measuring the phase difference between the projected and further analyze the plurality of images to extract an ambient illumination image of said scene and wherein said ambient illumination image is used to analyze one or more changes in the speckle pattern of at least one of the plurality of reflected diffused light elements in at least some consecutive images of the plurality of images.

In an embodiment, the at least one processor is configured to: measure the phase and amplitude of the reflected modulated structured light pattern to yield an illumination intensity of said one or more speckle patterns; analyze the phase to extract depth information data of the scene; and analyze, on said measured illumination intensity, the one or more changes in the speckle pattern of at least one of the plurality of reflected diffused light elements in at least some consecutive images of the plurality of images; identify at least one micro-vibration of the one or more objects based on said speckle pattern analysis and said measured illumination intensity.

In an embodiment, the processor is further configured to: classify or identify attributes of the one or more objects based on said identified at least one micro-vibration.

In an embodiment, the processor is further configured to: classify the least one or more objects present in the scene by visually analyzing at least one image of the plurality of images.

The system of claim 20 wherein the visual analysis comprises using at least one trained machine learning model for classifying the one or more at least one objects.

According to a third embodiment there is provided a non-transitory computer-readable storage medium with instructions stored thereon that, when executed by a computing system, causes the computing system to perform a method for detecting vibrations of one or more objects in a scene, said method comprising: receiving one or more images of the scene captured by a ToF imaging device, wherein each of said one or more images comprises reflections of said modulated and structured light projected by an illumination source of the ToF imaging device and by a structured light illumination source and reflected from one or more objects in the scene; analyzing said images to yield depth and illumination data of said scene; analyzing one or more changes or dynamics in one or more speckle patterns of at least one of the reflections of said structured light pattern in at least some consecutive images of the plurality of images; and identify the vibrations of the at least one object based on said speckle pattern analysis and said depth data.

BRIEF DESCRIPTION OF THE DRAWINGS

A better understanding of the features and advantages of the present disclosure will be obtained by reference to the following detailed description that sets forth illustrative embodiments, in which the principles of embodiments of the present disclosure are utilized, and the accompanying drawings.

FIG. 2A illustrates a flowchart of a method for detecting vibrations, such as micro-vibrations of one or more objects in a scene, using ToF imaging device and an additional illumination source, in accordance with some embodiments of the present disclosure;

FIG. 5 illustrates a flowchart of a method for detecting one or more objects of interest in a scene and further identifying vibrations micro-vibrations of the identified one or more objects in a scene, in accordance with some embodiments of the present disclosure.

DETAILED DESCRIPTION OF THE INVENTION

Figure 1A:
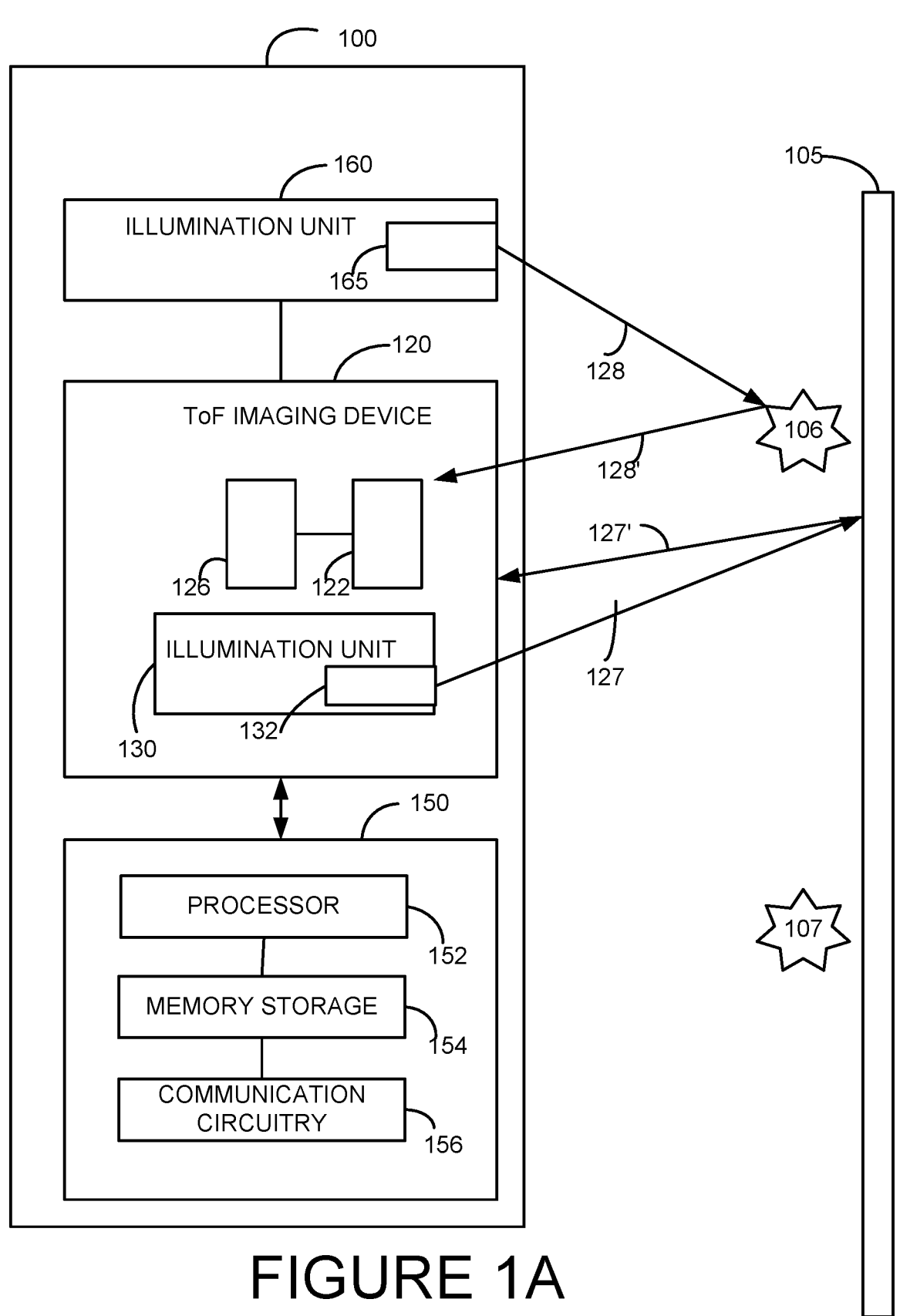
FIG. 1A shows a schematic diagram of a system comprising a ToF imaging device configured and enabled to capture sensory data of one or more objects, to detect speckle pattern dynamic for identifying vibrations and/or micro-vibrations of the objects in the scene, in accordance with some embodiments of the present disclosure.

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore the invention is not limited by that which is illustrated in the figure and described in the specification, but only as indicated in the accompanying claims, with the proper scope determined only by the broadest interpretation of said claims.

The configurations disclosed herein can be combined in one or more of many ways to provide improved vibrations detection and classification methods, systems and devices. One or more components of the configurations disclosed herein can be combined with each other in many ways. A system and method as described herein including a ToF imaging device and one or more illumination sources can be used to capture one or more images of a scene and extract visual data, depth data and speckle pattern(s) from the captured images to detect vibrations, for example micro-vibrations or motions, of one or more objects (and/or part(s) thereof) in the scene. Optionally the method and system may also identify and classify the one or more detected objects.

According to some embodiments, the system comprises one or more illumination sources configured to project light in a structured light pattern such as a predefined structured light pattern on the scene and a ToF imaging device comprising an illumination source configured to project modulated light into the scene and a ToF sensor configured to capture a plurality of images comprising reflections of the modulated and of the structured light pattern from one or more objects in the scene and ambient light images of one or more objects in the scene. According to some embodiments, the system further comprises one or more processors configured to: extract depth data of the one or more objects by analyzing the reflections of said modulated light and analyze one or more changes in one or more speckle patterns of at least one of the reflections of said structured light pattern in at least some consecutive images of the plurality of images; and identify one or more vibrations of the at least one object based on the speckle pattern analysis and the depth data.

Alternatively or in combination, data including the identified vibrations may be made available in order to provide useful information related to attributes of identified vibrations of the objects, for example with downloadable apps capable of connecting to the cloud based server and downloading information related to vibrations of the objects.

Advantageously, the system and methods in accordance with embodiments may include a single ToF imaging device to capture one or more images of the scene and extract visual data, depth data and speckle pattern(s) from the captured images to detect vibrations (e.g. micro-vibrations), for example, in real-time.

Additionally, the system's units such as the ToF sensor and the one or more illumination sources may be positioned in various configurations, for example attached to one another or in small proximity from one another to reduce the size, cost and complexity of the system. This advantage is possible since the triangulation principle is not required to generate a depth data, in accordance with embodiments.

Additionally, the systems and methods in accordance with embodiments may simultaneously capture depth map and capture ambient light image and detect vibrations of one or more objects in a scene as the ToF sensor is configured to capture a plurality of images comprising reflections of the modulated and the structured light pattern from the one or more objects in the scene.

As used herein, like characters refer to like elements.

As used herein, the term "light" encompasses electromagnetic radiation having wavelengths in one or more of the ultraviolet, visible, or infrared portions of the electromagnetic spectrum.

The term "structured light" as used herein is defined as the process of projecting a known pattern of pixels on to a scene. The way that these deform when striking surfaces allows vision systems to calculate the depth and surface information of the objects in the scene. Invisible structured light uses structured light without interfering with other computer vision tasks for which the projected pattern will be confusing.

The terms "pattern" and "pattern feature(s)" as used in this application refer to the structured illumination discussed below. The term "pattern" is used to denote the forms and shapes produced by any non-uniform illumination, in particular, structured illumination employed a plurality of pattern features, such as lines, stripes, dots, geometric shapes, etc., having uniform or different characteristics such as shape, size, intensity, etc. As a non-limiting example, a structured light illumination pattern may comprise multiple parallel lines as pattern features.

The term "structured light pattern" as used herein is defined as the process of projecting a light in a known pattern of pixels on to a scene.

The term "depth map" as used herein is defined as an image that contains information relating to the distance of the surfaces of scene and/or objects in the scene from a viewpoint. A depth map may be in the form of a mesh connecting all dots with z-axis data.

The term "object" as used herein is defined as any target of imaging, including any number of particular elements and/or background, and including scenes with particular elements. The disclosed systems and methods may be applied to the whole target of imaging as the object and/or to specific elements as objects within an imaged scene.

FIG. 1A shows a schematic diagram of a system 100, comprising a ToF imaging device 120, configured and enabled to capture sensory data of one or more objects, such as objects 106 and 107 in a scene 105 and analyze the captured sensory data to extract visual data and depth data to detect speckle pattern dynamic for identifying vibrations (e.g. micro-vibrations) of the objects in the scene 105, in accordance with embodiments. The system 100 may further include an illumination unit 160 (e.g. external illumination unit or first illumination unit) and a control board 150. The ToF imaging device 120 includes an illumination unit 130 (e.g. a second illumination unit or ToF illumination unit), which together with the external illumination unit 160 can be configured to capture the sensory data of scene 105, such as visual data, depth map(s) (e.g. density depth map(s)) and vibrations (e.g. micro-vibration data) of the scene 105 as described in further detail herein. In accordance with embodiments, the ToF imaging device 120 can measure the depth of the scene 105 and objects in the scene, such as objects 106 and 107, by quantifying the changes that an emitted light signal encounters when it bounces back from the scene or from one or more objects in the scene and use the reflected light pattern characteristics in each pixel of the ToF sensor to identify vibrations (e.g. micro-vibrations) of the objects.

The illumination unit 160 is configured to project a structured light pattern on scene 105, for example in one or more light spectrums. The structured light pattern may be constructed of a plurality of diffused light elements, for example, a dot, a light and/or a combination thereof. According to some embodiments, the illumination unit may comprise a light source 165 such as a coherent light source, for example, a laser and/or the like configured to emit coherent light such that the structured light pattern is a coherent structured light pattern.

According to some embodiments, the illumination unit 130 may be or may include a single-mode laser source 132, e.g. coherent light source According to some embodiments, the illumination unit 160 is configured to illuminate selected parts of the scene. Advantageously, selective illumination avoids unwanted noise for example in the form of too large or too small speckles which complicates the speckle analysis process to detect vibrations (e.g. micro-vibrations) and objects ref at the scene.

In some cases, the illumination unit 160 may include one or more optical elements for generating a pattern such as a pattern of spots that for example uniformly cover the field of view. This can be achieved by using one or more beam splitters including optical elements such as a diffractive optical element (DOE), split mirrors, one or more diffusers or any type of beam splitter configured to split the single laser spot to multiple spots. Other patterns such as a dot, a line, a shape and/or a combination thereof may be projected on the scene. In some cases, the illumination unit doesn't include a DOE.

In particular, the illumination source 165 may be controlled to produce or emit light in a number of spatial or two-dimensional patterns. Illumination may take the form of any of a large variety of wavelengths or ranges of wavelengths of electromagnetic energy. For instance, illumination may include electromagnetic energy of wavelengths in an optical range or portion of the electromagnetic spectrum including wavelengths in a human-visible range or portion (e.g., approximately 390 nm-750 nm) and/or wavelengths in the near-infrared (NIR) (e.g., approximately 750 nm-1400 nm) or infrared (e.g., approximately 750 nm-1 mm) portions and/or the near-ultraviolet (NUV) (e.g., approximately 400 nm-300 nm) or ultraviolet (e.g., approximately 400 nm-122 nm) portions of the electromagnetic spectrum. The particular wavelengths are exemplary and not meant to be limiting. Other wavelengths of electromagnetic energy may be employed. In some cases, the illumination source 165 wavelength may be any one of 830 nm or 840 nm or 850 nm or 940 nm.

According to one embodiment, the ToF imaging device 120 may be a Continuous Wave Modulation (CWM) ToF camera, however other types of ToF imaging devices may be used in accordance with embodiments. The ToF imaging device 120 may include a transducer or sensor 126 such as a CMOS or CCD sensors. For example the sensor 126 may include a two-dimensional array of photo-sensitive or photo-responsive elements, for instance a two-dimensional array of photodiodes or a two-dimensional array of charge coupled devices (CODs), wherein each pixel of the sensor 126 measures the time the light has taken to travel from the illumination unit 130 (to the object and back to the focal plane array).

According to one embodiment, the ToF sensor 126 may be a VGA 640×480 pixels sensor used with an illumination source generating a beam of a wavelength of 950 nm, modulated at 75 MHz (creating a 2 m range), however other types of illumination sources and sensors in different ranges may be used.

The ToF imaging device 120 includes an optical unit 122 comprising one or more lens for gathering the reflected light and images from the scene onto the sensor 126. In some cases, the optical unit may further include one or more optical band-pass filter, for example for passing only the light with the same wavelength as the illumination unit.

The ToF imaging device 120 further comprises an illumination unit 130 configured to project light such as near-infrared light emitted by active modulation of the illumination source 132. In some cases, the illumination source may be a modulated light source such as a laser or LED.

The ToF imaging device 120 may optionally include a buffer communicatively coupled to the sensor 126 to receive image data measured, captured or otherwise sensed or acquired by the sensor 126. The buffer may temporarily store image data until the image data is processed.

According to embodiments, each pixel of the sensor 126 is configured to perform more than one measurement, typically four different measurements, at different time intervals at each frame for estimating the four values of the cross-correlation signal, for example, according to the 4-Bucket method as illustrated below.

According to one embodiment, in operation, the sensor 126 is configured to read out the incoming photons and convert them into electron charges. Following a signal clocking and demodulation the reflected signal $C(\psi)$ is integrated for example at four equally spaced intervals, for example over an equal-length $\Delta t$, within one modulation period T. These four signal values may be stored independently, for example at a buffer or at any storage unit. The cycle of integration and storage can be repeated over many periods for example: for f=30 MHz and at 30 frames per second (FPS) $30\times10^{6}/30=10^{6}$ cycles per frame (one million) integration periods are possible.

In accordance with embodiments, the ToF imaging device 120 is configured to estimate sensory data including for example depth parameters of the scene, e.g., the distance of the detected objects to the imaging device, reflectance and ambient illumination (e.g. background) in each pixel. The measured sensory data is analyzed for example by the one or more processors such as the processor 152 to identify one or more vibrations (e.g. micro-vibrations) of objects in scene 105 and to extract the distance of the detected objects to the imaging device, reflectance and ambient illumination (background) in each pixel.

The control board 150 may comprise one or more of a processor 152, memory storage 154 and communication circuitry 156. Components of the control board 150 can be configured to transmit, store, and/or analyze the captured sensory data, as described in further detail herein.

In operation, light, such as near-infrared light emitted by active modulation of the illumination source 132 and pattern light emitted by the light source 165, is detected and demodulated by the array of pixels of the sensor 126 of the ToF imaging device 120. Additionally, the structured light pattern projected by the illumination unit 160 to one or more sections in scene 105, for example to selected parts in the scene, is received at the sensor 126. At the next step, the ToF sensor 126 measures the amplitude, offset and phase of the received signal, for example simultaneously.

Specifically, the sensor 126 is configured to measure the phase difference between the sent signals 127, 128 and received signals 127' and 128'. In accordance with some embodiments, different shapes of signals may be used, e.g., sinusoidal, square waves, etc. At the following step, the cross-correlation between the received and sent signals allows phase estimation which is directly related to the distance of the objects as the modulation frequency is known.

More specifically, an example of cross-correlation between the sent and received signals are measured as follows:

Emitted signal: $s(t)=c+a\cos(2\pi ft)$

Received signal: $r(t)=c+A\cos(2\pi f(t-\tau))+B$

Cross-correlation between emitted and received signals measured according to Equation (1):

$$C(x)=\lim_{T\to\infty}\frac{1}{T}\int_{-T/2}^{T/2}r(t)s(t+x)dt \qquad \text{Equation (1)}$$

and the solution is, according to Equation (2):

$$C(\psi)=\frac{aA}{2}\cos\left(\underbrace{2\pi f\tau}_{\phi}+\underbrace{2\pi fx}_{\psi}\right)+B$$

Where:

c>a (e.g. in a full modulation case c=a and then the light goes from 0 to 2a).

$\Phi$ is the phase

A is the amplitude of the received signal and it depends on the object's reflectivity and of the sensor's sensitivity.

B is an offset coefficient due to the ambient illumination

Figure 1B:
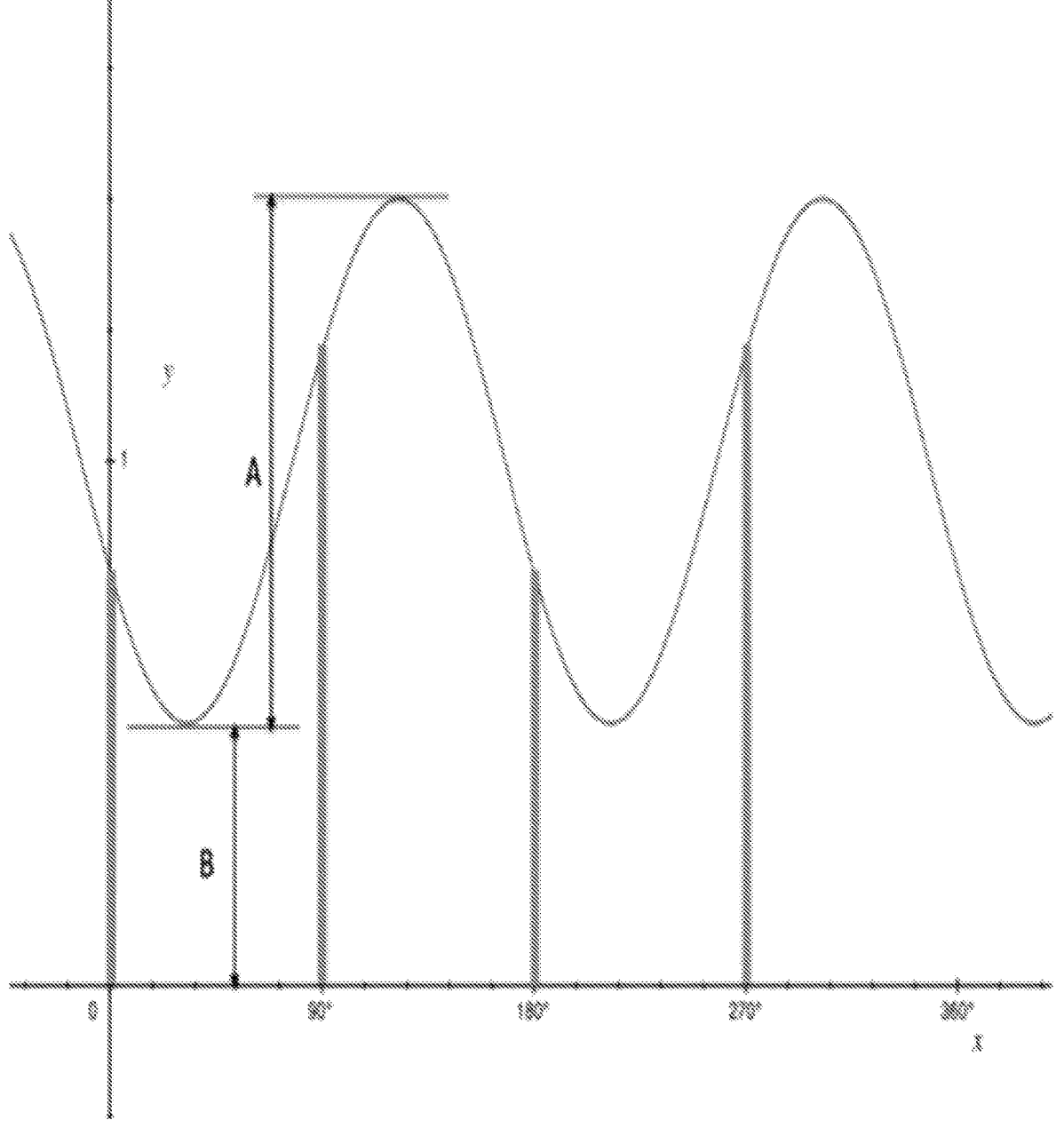
FIG. 1B shows a diagram example of the measured four points of a modulated signal, in accordance with some embodiments of the present disclosure.

According to embodiments, the phase ($\Phi$), amplitude (A) and offset (B) may be extracted by measuring the received signals such as received signals 127' 128' at four separate modulation points at each of the sensor pixels. For example, as shown in FIG. 1B the received signal C($\psi$) may be measured at the following four points:

$\psi_0=0°$, $\psi_1=90°$, $\psi_2=180°$, $\psi_3=270°$

In accordance with embodiments, each light pattern (e.g. spot) covered by one or more of the ToF sensor 126 pixels includes a strong speckle pattern results for each spot, originating from the interference of the micro structure of the one or more objects illuminated. Specifically, when the one or more objects move, mostly changing their tilt with respect to the imaging device, a change in the speckle pattern will result. This change is very sensitive, so a micro-radian scale tilt produces a detectable change in the speckle pattern.

At the following step, the speckle pattern structure is detected based on the measured coefficient B and accordingly the changes in the speckle pattern over time in this image B are detected to identify vibrations (e.g. micro-vibrations) of the one or more objects. For example, one or more changes in one or more speckle patterns are analyzed of at least one of the reflections of the structured light pattern in at least some consecutive images of the plurality of images.

According to some embodiments, system 100 may be installed, and/or mounted, and/or integrated and/or embedded in a vehicle, specifically in a cabin of the vehicle such that the scene 105 is the cabin interior and the object(s) present in the cabin may include, for example, one or more vehicle occupants (e.g. a driver, a passenger, a pet, etc.), one or more objects associated with the cabin (e.g. seta, door, window, headrest, armrest, etc.), an item associated with one or more of the vehicle occupant(s) (e.g. an infant seat, a pet cage, a briefcase, a toy, etc.) and/or the like. Optionally, the ToF imaging device 120 and the control unit 150 are integrated together in a single device. In some cases, the imaging device 120 and the control unit 150 are integrated separately in different devices.

FIG. 2A illustrates a flowchart 200 of one embodiment of a method for detecting vibrations (e.g. micro-vibrations) of one or more objects in a scene, using ToF imaging device and an additional illumination source, for example as shown in FIG. 1A. In other embodiments, the method includes different or additional steps than those described in conjunction with FIG. 2A. Additionally, in various embodiments, steps of the method may be performed in different orders than the order described in conjunction with FIG. 2A.

At step 210 modulated light is projected into the scene, for example by the illumination source 132 (e.g. the second illumination source) of the ToF imaging device 120 as further described above.

At step 220 a structured light pattern is projected to the scene 105, for example by the illumination source 165 (e.g. external illumination source or first illumination source). In various embodiments, the projected light pattern may be a pattern of spots that for example uniformly cover the scene or selective portions of the scene. As the light is projected into the scene, spots from the light pattern fall onto one or more objects of interest. In some cases, the light is projected by the illumination source 165 using a diffractive optical element (DOE) to split a single laser spot to multiple spots as described in FIG. 1A. Other patterns such as a dot, a line, a shape and/or a combination thereof may be projected on the scene. In some cases, the illumination unit doesn't include a DOE.

In some cases, each reflected light pattern (e.g. spot) is covered by one or more of the ToF sensor pixels. For example, each spot may be covered by a 5×5 pixel window.

At step 230 one or more images of the scene captured by the ToF sensor 126 are received, for example at the processor 152. The captured images include the light pattern reflected (i.e., the "reflected light pattern" or spots) by the one or more objects of interest (and/or reflected by other objects). Additionally, the received images include a resulted speckle pattern for each reflected light pattern (e.g. spot), originating from the interference of the micro structure of the illuminated one or more objects and/or from the movement of the objects.

Optionally, at step 240 the received images are analyzed to identify and/or to classify one or more objects in the scene.

At step 250 the received images, which comprise the light pattern reflected (i.e., the "reflected light pattern") by the one or more objects of interest (and/or reflected by other objects) are analyzed by the processor 152 to yield depth data. Additionally, the received images are analyzed to extract one or more images comprising the measured ambient light (e.g. Background) of the scene and/or the one or more objects of interest.

Specifically the depth data is extracted by measuring the phase difference between the projected and reflected modulated light. More Specifically, the depth data include depth parameters obtained and measured by the ToF sensor which may be extracted as follows:

continuous wave modulation-measuring the phase difference between the sent and received signals, the modulated frequency (e.g. wherein the range 10 to 100 MHz).

relationship between phase shift and distance x from the objects $$\varphi = 2\pi f x / c$$

where f is the modulation frequency

In accordance with embodiments, phi is estimated based on cross-correlation between the sent and received signals. For example according to the following Equation (3).

$$phi = \arctan((c3 - c4)/(c1 - c2)) \qquad \text{Equation (3)}$$

Additionally the intensity and ambient light are estimated as follows:

$$A = sqrt((c1 - c2)^2 + (c3 - c4)^2)/2$$

$$B = (c1 + c2 + c3 + c4)/4$$

Where:

A is the intensity

B is offset or background.

C1, C2, C3, C4 are the four measuring points

At step 260 the measured coefficient ambient light B images including the reflected light pattern as obtained by the ToF sensor 126 are used to analyze changes in one or more speckles pattern structure over time formed at each spot to identify one or more vibrations such as micro-vibrations of the one or more objects.

Figure 2B:
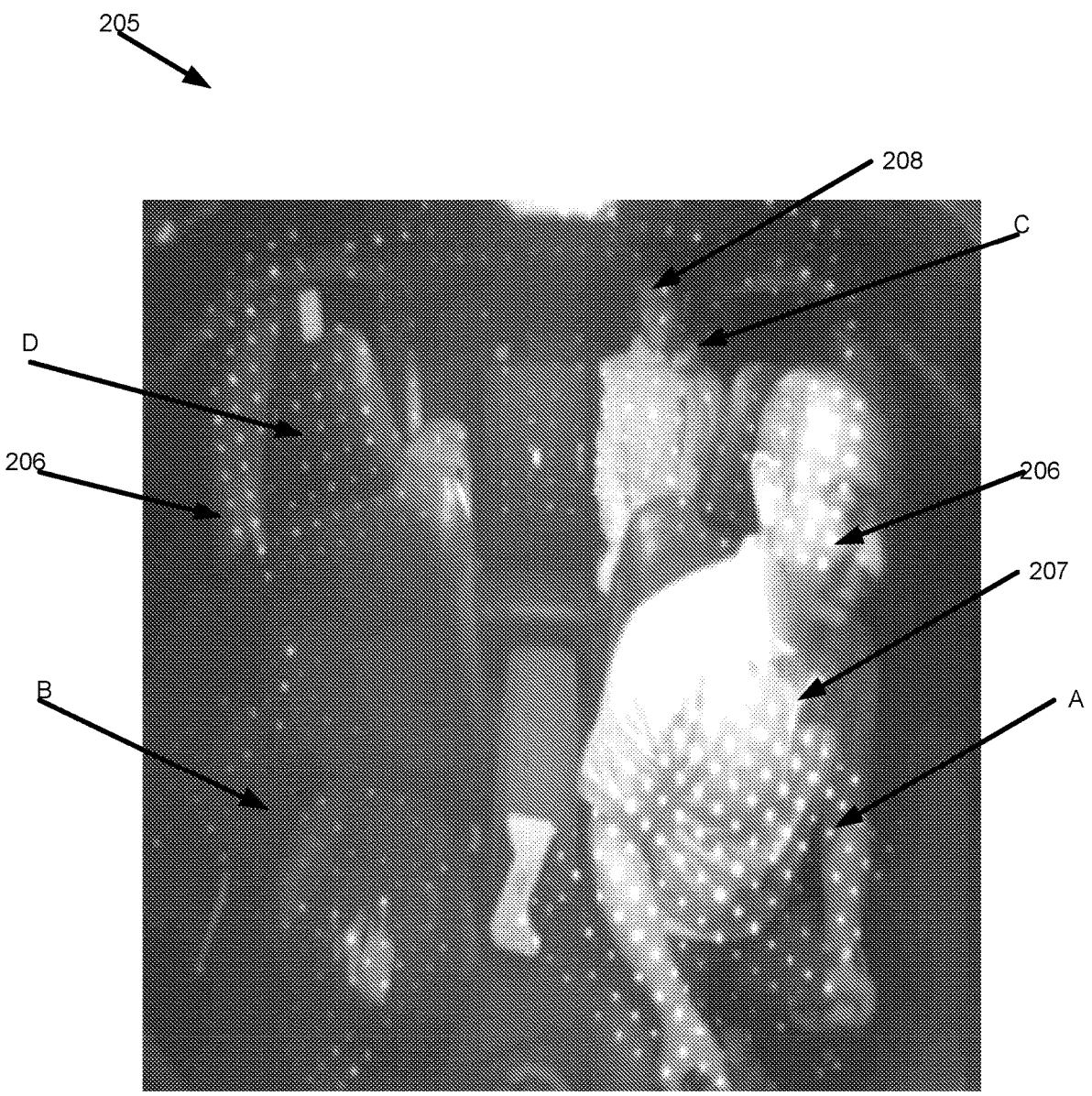
FIG. 2B shows an example of an obtained ambient light B image including reflected structured light pattern, according to one embodiment.

FIG. 2B shows an example of an obtained ambient light B image 205 including reflected structured light pattern, according to one embodiment. The image 205 includes the reflected structured light pattern in the form of a pattern of spots (white spots 206) which were projected and reflected from selected sections of a vehicle cabin, e.g. driver front seat A, passenger front seat B, passenger back seats C and D, including a number of objects such as the driver 207 and the passenger 208. In accordance with embodiments, one or more changes in one or more speckle patterns of at least one of the reflections of the structured light pattern (e.g. spots 206) are analyzed in at least some consecutive images (e.g. for example image 206 and the sequential image) of the plurality of images to identify the vibrations (e.g. micro-vibrations) of the at least one object based on said speckle pattern analysis and said depth data.

According to some embodiments, the identified vibrations (e.g. micro-vibrations) may be used for various applications and systems. For example, the identified micro-vibrations and the depth data allow rapid and direct finding of the one or more object classification (class) of the object(s) detected in the scene and/or the attribute(s) (e.g. motion, gesture, facial expression, bodily positioning, limb positioning, size, shape, etc.), and/or motion of the object(s).

According to some embodiments, the identification of one or more micro-vibrations of step 260 may include, for example, respiration, heartbeat, pulse, an eye movement, an eyelid movement, a subtle limb (e.g. hand, leg) movement, a subtle head movement and/or the like by analyzing at least some of the captured images comprising the measured ambient light (B) and the structured light (e.g. spots) to detect changes to a speckle pattern of one or more of the diffused light elements of the structured light pattern reflected back from the object(s) present in the scene 105. The changes to the speckle pattern may be indicative of micro-vibrations, i.e. very small and subtle movements that may be too minor to be detected by analyzing variations in the depth data extracted from the captured images.

In some cases, the speckles pattern analysis may include detecting the changes to the speckle pattern by measuring a temporal standard deviation in the intensity of the respective reflected diffused light element over multiple consecutive captured images to identify a temporal distortion pattern. For example, assuming $I_n$ is the gray level intensity a certain pixel depicting a reflected diffused light pattern and/or a part thereof in an image n. For example, the processor 152 may calculate the temporal standard deviation according to equation (4) below:

$$S_n = \sum_{i=n-k}^{n} I_i^2 - \left( \sum_{i=n-k}^{n} I_i \right)^2 \qquad \text{Equation (4)}$$

Where n is the current image and k is the number of previous images.

The analysis further includes comparing the result of the temporal standard deviation to a predefined threshold value to determine whether a micro-vibration occurred. In case the temporal standard deviation value exceeds the predefined threshold, it is determined, for example by the processor, that a micro-vibration increased while in case the temporal standard deviation value does not exceed the predefined threshold, the processor 152 may determine no change in the micro-vibration has occurred. In some cases, the predefined threshold value may be fixed and set in advance. Optionally, the predefined threshold value is dynamically adjusted according to the value of the temporal standard deviation measured over time.

Optionally, in order to improve immunity to noise which may affect the intensity level of the speckle pattern and increase the Signal to Noise Ratio (SNR) of the intensity of the speckle pattern, the temporal standard deviation may be averaged over multiple pixels (e.g. 5×5 pixels) of each spot.

Optionally, in order to improve immunity to noise which may affect the intensity level of the speckle pattern and increase the Signal to Noise Ratio (SNR) of the intensity of the speckle pattern, the temporal standard deviation may be averaged over multiple speckle patterns of diffused light elements reflected from the same surface and portrayed in the same region in the captured images.

According to another embodiment, the changes to the speckle pattern may be detected, for example, by the processor 152, by analyzing the speckle pattern for lateral translation which is indicative of a tilt of the speckle pattern with respect to the sensor, e.g. ToF sensor 126. The tilt which may be very minor, for example, on a scale of micro-radians may be derived from an angular velocity of one or more speckle pattern point(s) over time (consecutive frames). Assuming a constant intensity of the speckle pattern point(s) over time, the angular velocity may be derived from analysis of the lateral translation of the speckle pattern point(s) of the diffused light element(s) depicted in a plurality of consecutively captured images according to equation (5) below.

$$v = \frac{\frac{dI}{dt}}{\frac{dI}{dx}} \qquad \text{Equation (5)}$$

Where I is the intensity of the pixel in the captured image in gray level differentiated with respect to a time t or position x.

The angular velocity in a change of a certain pixel (i,j) with respect to its neighboring pixels in the i direction in captured image n may be expressed by equation (6) below.

$$vi_{i,j}^n \approx \frac{I_{i,j}^n - I_{i,j}^{n-1}}{I_{i+1,j}^n - I_{i-1,j}^n} \qquad \text{Equation (6)}$$

The angular velocity in a change of a certain pixel (i,j) may be expressed similarly in the j direction. The result of the angular velocity is expressed in pixel per frame units.

Optionally, the intensity $I_{i,j}$ of the pixel (i,j) may be normalized, for example by the processor, overtime to compensate for non-uniformity in intensity $I_{i,j}$ due to spot intensity envelope effects. For example, the intensity $I_{i,j}$ may be normalized by applying a sliding temporal window for averaging the intensity $I_{i,j}$ of one or more pixels (i,j) in the captured images.

In another example, the analyzer 240 may smooth the intensity $I_{i,j}$ in the time domain by applying an infinite impulse response to the $I_{i,j}$ to produce a smoothed intensity $\bar{I}_{i,j}$ as expressed in equation (7) below.

$$\bar{I}_{i,j} = \alpha I_{i,j}^n + (1 - \alpha)\bar{I}_{i,j} \qquad \text{Equation (7)}$$

Where $\alpha$ is a small factor, for example, 0.05.

The intensity $I_{i,j}$ of one or more of the pixels (i,j) may be normalized by dividing it with the average intensity measured over time in a plurality of consecutively captured images to produce a normalized intensity $$\hat{I}_{i,j}^n$$

as expressed in equation (8) below.

$$\hat{I}_{i,j}^n \equiv \frac{I_{i,j}^n}{\bar{I}_{i,j}} \qquad \text{Equation (8)}$$

Replacing the expression of the intensity $$I_{i,j}^n$$

in equation (6) with the normalized intensity $$\hat{I}_{i,j}^n,$$

the angular velocity may be expressed by equation (9) below.

$$vi_{i,j}^n \approx \frac{\hat{I}_{i,j}^n - \hat{I}_{i,j}^{n-1}}{\hat{I}_{i+1,j}^n - \hat{I}_{i-1,j}^n} \qquad \text{Equation (9)}$$

In some cases, in order to further improve the robustness of the measured intensity against noise effects, the processor may further spatially average the intensity over multiple adjacents reflected diffused light elements (e.g. dots, spots, etc.) in the captured images. The processor may further apply temporal filtering over the spatially averaged intensity value to improve the resulting intensity signal.

Further details on the speckle pattern analysis for detecting the micro-vibrations may be found in International Application No. IL2015/051255 (Publication WO2016/103271) entitled "System and Method for Detecting Surface Vibrations" filed Dec. 27, 2015, the contents of which are incorporated herein by reference in their entirety.

Figure 3A:
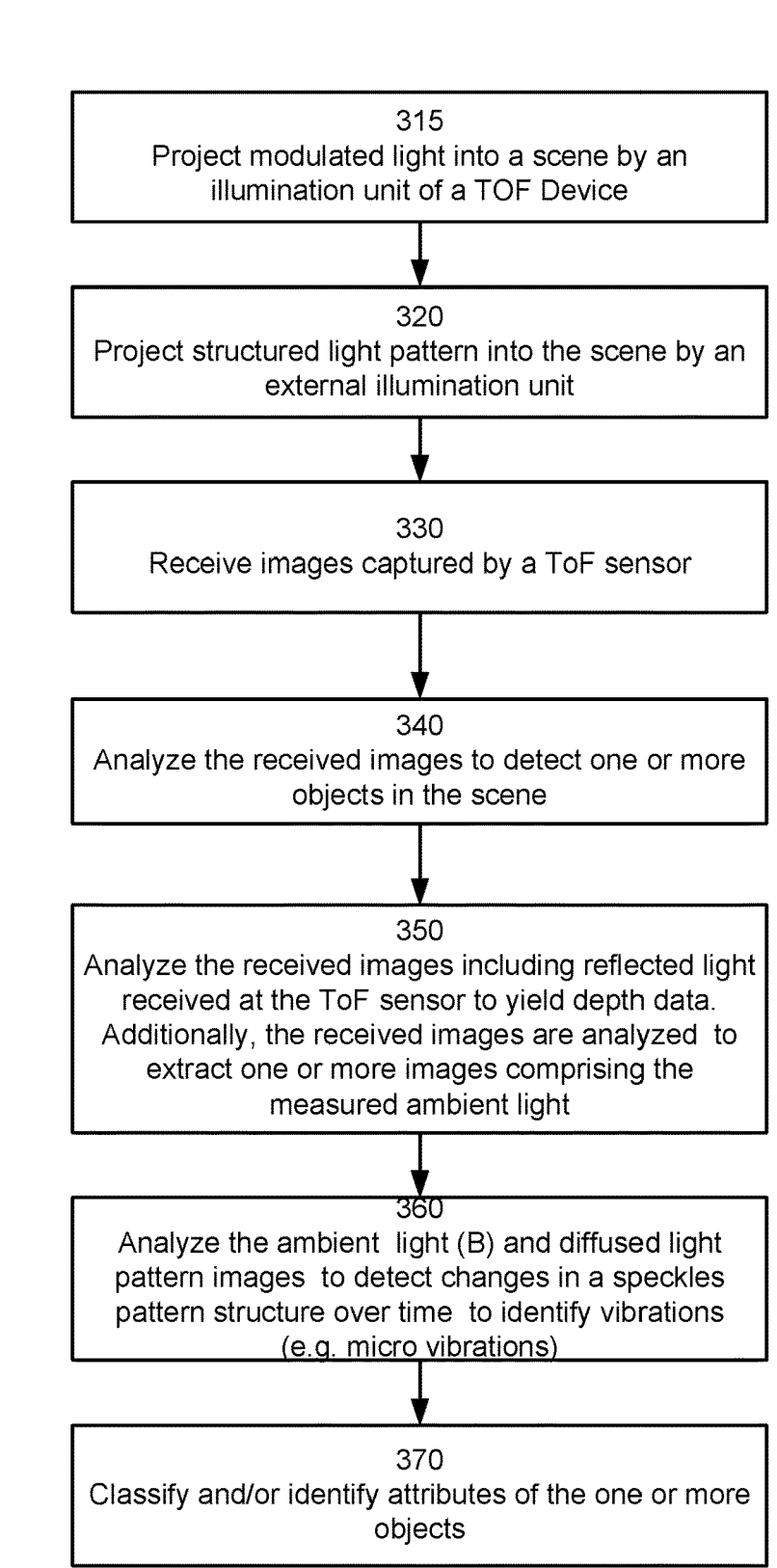
FIG. 3A illustrates a flowchart of a method for detecting one or more objects of interest in a scene and further identifying vibrations micro-vibrations of the identified one or more objects in a scene, using ToF imaging device and an additional illumination source, in accordance with some embodiments of the present disclosure.

FIG. 3A illustrates a flowchart 300 of one embodiment of a method for detecting one or more objects of interest in a scene and further identifying vibrations (e.g. micro-vibrations) of the identified one or more objects in a scene. For example, the method may include identifying the presence of a baby and/or a baby seat in a scene (e.g. objects of interest) and may further identify that the baby is awake and/or that the baby safety belt is released or unreleased. In other embodiments, the method includes different or additional steps than those described in conjunction with FIG. 3A. Additionally, in various embodiments, steps of the method may be performed in different orders than the order described in conjunction with FIG. 3A.

At step 315 modulated light is projected into the scene, for example by the illumination source 132 (e.g. the second illumination source) of the ToF imaging device 120 as further described above.

At step 320 a structured light pattern is projected to the scene 105, for example by the illumination source 165 (e.g. first/external illumination source). In various embodiments, the projected light pattern may be a pattern of spots that for example uniformly cover the scene or selective portions of the scene. As the light is projected into the scene, spots from the light pattern fall onto one or more objects of interest. In some cases, the light is projected by the illumination source 165 using a diffractive optical element (DOE) to split a single laser spot to multiple spots as described in FIG. 1A. Other patterns such as lines are possible as well. Other patterns such as a dot, a line, a shape and/or a combination thereof may be projected on the scene. In some cases, the illumination unit doesn't include a DOE.

At step 330 one or more images of the scene captured by the ToF sensor 126 are received, for example at the processor. The captured images include the light pattern reflected (i.e., the "reflected light pattern" or spots) by the one or more objects of interest (and reflected by other objects). Additionally, the received images include a resulted speckle pattern for each reflected light pattern (e.g. spot), originating from the interference of the micro structure of the illuminated one or more objects and/or from the movement of the objects.

Optionally, at step 340 one or more objects are classified and/or identified, for example by visually analyzing at least one of the received images and/or by analyzing the depth data, obtained for example in the following step (step 350). For example, the images are analyzed by the processor 152 to detect and classify one or more objects present in scene 105, for example, a human, an item and/or the like. The analysis may apply one or more machine learning models and/or algorithms, for example, a neural network, a Support Vector Machine (SVM), a decision tree learning algorithm, a K-Nearest neighbors algorithm and/or any other machine learning algorithm as known in the art trained to detect and/or classify the object(s) in the scene. The machine learning model(s) and/or algorithm(s) may be further trained to identify one or more attributes of the detected object(s), for example, a motion, a gesture, a facial expression, a bodily positioning, a limb positioning, a size, a shape and/or the like.

At step 350 the received images including light pattern reflected (i.e., the "reflected light pattern") by the one or more objects of interest (and reflected by other objects) are analyzed by the processor 152 to yield depth data. Additionally, the received images are analyzed to extract one or more images comprising the measured ambient light (e.g. Background) of the scene and/or the one or more objects of interest.

At step 360 the measured coefficient ambient light B images including the reflected light pattern as obtained by the ToF sensor are used to analyzed changes in one or more speckles pattern structure over time formed at each spot to identify vibrations (e.g. one or more micro-vibrations) of the one or more objects. For example, one or more changes in one or more speckle patterns of at least one of the reflections of the structured light pattern are analyzed in at least some consecutive images of the plurality of images to identify the vibrations of the at least one object based on said speckle pattern analysis and said depth data.

According to some embodiments, the identified micro-vibrations may be used for various applications and systems. For example, at step 370 the identified micro-vibrations and the depth data allow rapid and direct finding of the one or more object classification (class) of the object(s) detected in the scene and/or the attribute(s) (e.g. motion, gesture, facial expression, bodily positioning, limb positioning, size, shape, etc.), and/or motion of the object(s).

In some cases, based on the analysis of the reflected light pattern, one or more object of interest are segmented from the scene, allowing for a rapid and direct finding of objects in the scene and rapid identification of objects of interest (e.g., head, leg) in the scene. For example, an image of light reflected by the scene is scanned and each pixel in the image is identified as "background" or as an "object" (e.g., head).

For example at step 370, the processor may output the classification (class) of the object(s) detected in the scene, the attribute(s) (e.g. motion, gesture, facial expression, bodily positioning, limb positioning, size, shape, etc.), motion of the object(s) as derived from the depth data analysis and the micro-vibration(s) detected for the object(s), the classification may include one or more class labels each associated with a probability score indicating the probability that the detected object is of the respective class, for example, a vector, a list, a table and/or the like.

According to some embodiments, the classification may be executed, for example by the processor 152, using a trained neural network classifier. Other options may include template matching, edge detection, etc.

For example, one or more processors, such as processor 152 may apply one or more machine learning models and/or algorithms, for example, a neural network, a Support Vector Machine (SVM), a decision tree learning algorithm, a K-Nearest neighbors algorithm and/or any other machine learning algorithm as known in the art trained to detect and/or classify the object(s) in the scene. The machine learning model(s) and/or algorithm(s) may be further trained to identify one or more attributes of the detected object(s), for example, a motion, a gesture, a facial expression, a bodily positioning, a limb positioning, a size, a shape and/or the like.

The machine learning model(s) and/or algorithm(s) may be constructed and trained to detect and classify the objects according to the visual data depicted in the image(s) where the visual data relates to the object(s) themselves and does not include the reflected structured light pattern reflected from the object(s).

In some cases, to prevent artifacts and/or visual effects induced by the reflected structured light pattern, the processor 152 may operate the light source to periodically project the structured light pattern. For example, since the illumination sources (e.g. 132 and/or 165) and the sensor (e.g. ToF sensor 126) may be time synchronized, the processor 152 may operate the light source to emit the structured light pattern every other frame captured by the imaging sensor, every 3rd frame, every 5th frame and/or the like.

Optionally, in order to improve accuracy of the detection and classification of the object(s) present in the scene 105, the machine learning model(s) and/or algorithm(s) may be constructed and trained to detect and classify the objects according to the visual data depicted in the image(s) comprising the structured light pattern reflected from the object(s). As such the machine learning model(s) and/or algorithm(s) may be trained to classify the objects and/or their attribute(s) according to both the visual properties of the object(s) as well as according to the depth data expressed by the light elements reflected from the object(s) and hence depicted in the image(s).

Figure 3B:
FIG. 3B is a schematic illustration of an exemplary neural network used for analyzing images captured by a system comprising a ToF camera to detect and classify objects in a scene, in accordance with some embodiments of the present disclosure.
Figure 3B:
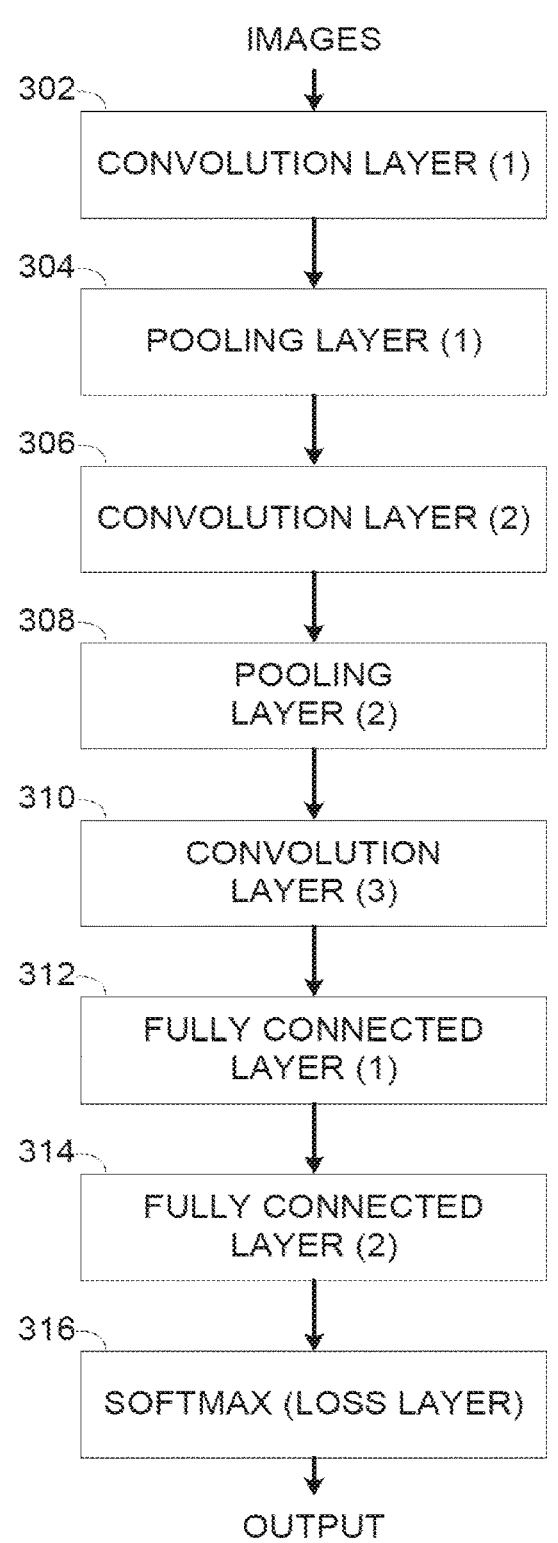
Figure 4:
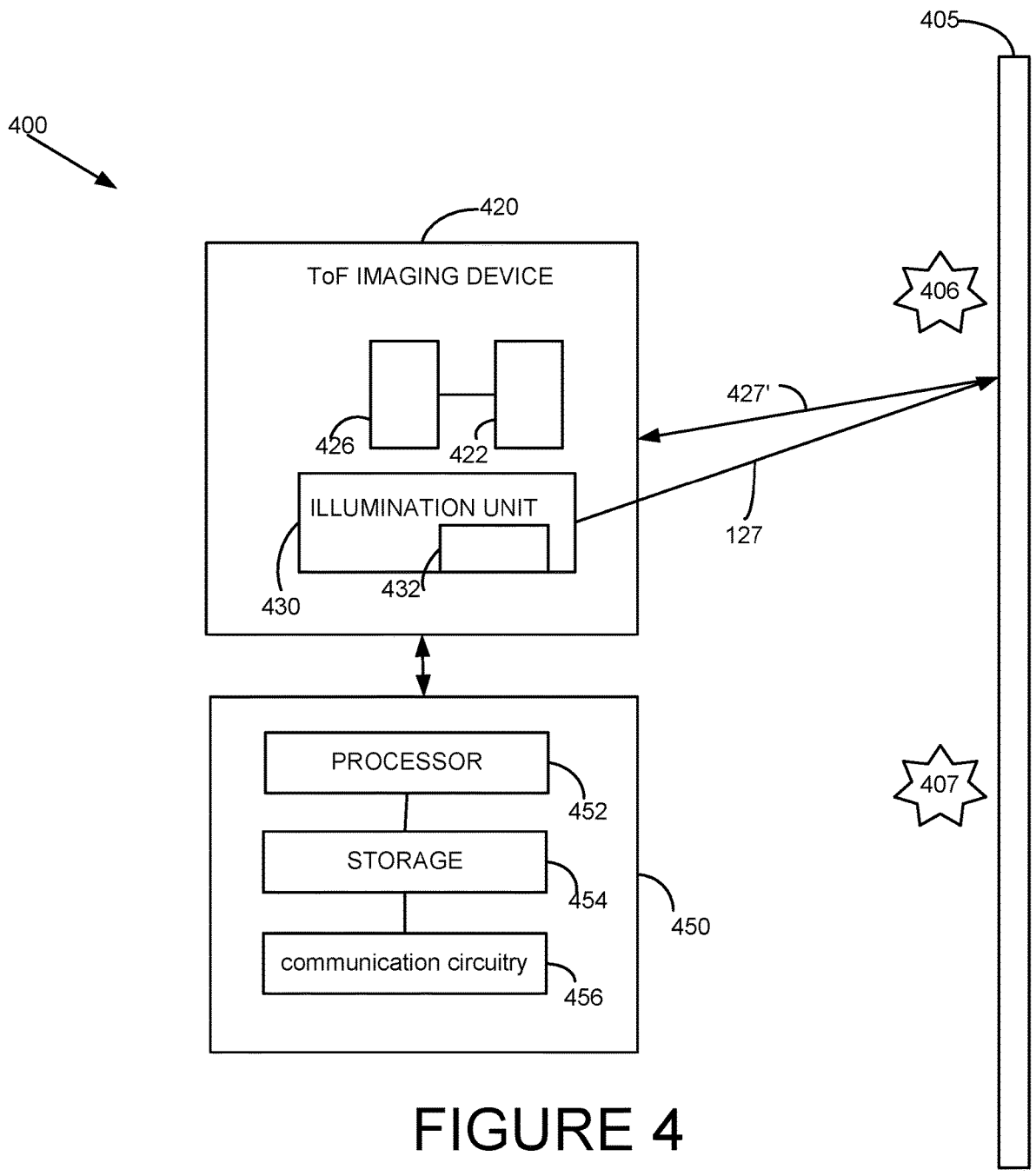
FIG. 4 shows a schematic diagram of a system comprising a ToF imaging device and a single illumination unit configured and enabled to capture sensory data of one or more objects, to detect speckle pattern dynamic for identifying vibrations and micro-vibrations of the objects in the scene, in accordance with some embodiments of the present disclosure.

Reference is now made to FIG. 3B, which is a schematic illustration of an exemplary neural network used for visually analyzing images captured by an apparatus or a system, such as system 100 comprising a ToF camera 120 to detect and classify objects in a scene, according to some embodiments. An exemplary neural network 301, for example, a Convolutional Neural Network (CNN) and/or the like may be applied by an analyzer or a processor such as the processor 152 to detect and classify one or more objects in a scene such as the scene 105 and optionally one or more of the attributes of the object(s).

The processor 152 may apply the neural network 301 to visually analyze one or more of the captured images which may include image(s) depicting the reflected structured light pattern and/or reflected modulated light and/or images that do not depict the reflected structured light pattern. Based on the implementation, the machine learning model(s) and/or algorithm(s) may be trained to detect and classify the objects according to the visual information of the objects and optionally according to the reflected structured light pattern and reflected modulated light expressing depth characteristics of the object(s).

The neural network 301 may include an input layer to receive the captured image(s), a first convolutional layer 302, a first polling (down sampling) layer 304, a second convolutional layer 306, a second polling layer 308, a third convolutional layer 310, a first fully connected layer 312, a second fully connected layer 314, a SOFTMAX loss layer 316 and an output layer outputting the estimated classification. The classification may typically include one or more class labels each associated with a probability score indicating the probability that a detect object is of the respective class.

The neural network 301 may be trained with a plurality of training datasets comprising a plurality of training images depicting a scene such as the scene 105, for example, a cabin of a vehicle and/or the like in which one or more objects are present, for example, a vehicle occupant (e.g. a driver, a passenger, a pet, etc.), an object of the cabin, an item associated with one or more of the vehicle occupant(s) and/or the like. Optionally, the neural network 301 is trained with a plurality of training datasets comprising a plurality of training images in which in addition to the visual data of the scene, the images depict the structured light pattern reflected from the object(s) in the scene.

According to some embodiments, all modalities, i.e. the visual data, the depth data, and the speckle pattern are all extracted from the same images, and advantageously the classification, the motion, and the micro-vibrations may be inherently registered (aligned) in the same coordinate system. As such, the classification, the motion and the micro-vibrations may be easily correlated to the object(s) according to the spatial parameters (coordinates) of the data of each of the modalities which all refer to the same coordinate system. The accuracy in associating the attributes, the motion and the micro-vibration(s) with the corresponding object(s) detected in scene 105 may, therefore, be significantly improved.

When deployed in the vehicle cabin, the processor may provide the object(s) class, attribute(s), motion and/or micro-vibration(s) to one or more vehicle related applications which may take advantage of the provided data. For example, a driver monitoring safety system and/or application may analyze the provided data to verify that the driver is awake and concentrated on driving the vehicle. In another example, a passenger safety system and/or application may analyze the provided data to verify that each vehicle occupant (e.g. driver, passenger) detected in the vehicle cabin is properly wearing his safety belt. In another example, the passenger safety system and/or application may analyze the provided data to verify no infant(s) and/or pet(s) are forgotten in the cabin after other passenger(s) have left the scene. In another example, a passenger comfort system and/or application may adjust an air-conditioning system according to a count (number) of vehicle occupants detected in the cabin.

According to another embodiment, an infotainment system and/or application may adjust one or more multimedia systems according to the count of the vehicle occupants detected in the cabin, specifically according to the location of the vehicle occupant(s) within the cabin, for example, a front seat, a back seat, a right side seat, a left side seat and/or the like. In another example, a vehicle security system and/or application may detect an intruder entering and/or attempting to enter the cabin.

The neural network 301 may include an input layer to receive the captured image(s), a first convolutional layer 302, a first pooling (down sampling) layer 304, a second convolutional layer 306, a second pooling layer 308, a third convolutional layer 310, a first fully connected layer 312, a second fully connected layer 314, a SOFTMAX loss layer 316 and an output layer outputting the estimated classification. The classification may typically include one or more class labels each associated with a probability score indicating the probability that a detect object is of the respective class.

The illumination unit 430 is configured to project a structured light pattern on scene 405, for example in one or more light spectrums. The structured light pattern may be constructed of a plurality of diffused light elements, for example, a dot, a light and/or a combination thereof. According to some embodiments, the illumination unit 430 may comprise a light source 432 such as a coherent light source, for example, a laser and/or the like configured to emit coherent light such that the structured light pattern is a coherent structured light pattern.

According to some embodiments, the light source 432 may be a single-mode laser source which is configured to project light into the scene in a specific light pattern. For example, the light may be shaped into one or more spots. Accordingly, the depth data such as the distance will be obtained in the reflected spot image, as well as the reflected speckle, as will be explained in detail hereinbelow.

In some cases, the illumination source 432 may include one or more optical elements for generating the pattern such as a pattern of spots. For example, this may be achieved by using one or more optical elements such as a diffractive optical element (DOE) configured to split the single laser spot to multiple spots. Other patterns such as a dot, a line, a shape and/or a combination thereof may be projected on the scene. In some cases, the illumination unit doesn't include a DOE.

In particular, the illumination source 432 may be controlled to produce or emit light in a number of spatial or two-dimensional patterns. Illumination may take the form of any of a large variety of wavelengths or ranges of wavelengths of electromagnetic energy. For instance, illumination may include electromagnetic energy of wavelengths in an optical range or portion of the electromagnetic spectrum including wavelengths in a human-visible range or portion (e.g., approximately 390 nm-750 nm) and/or wavelengths in the near-infrared (NIR) (e.g., approximately 750 nm-1400 nm) or infrared (e.g., approximately 750 nm-1 mm) portions and/or the near-ultraviolet (NUV) (e.g., approximately 400 nm-300 nm) or ultraviolet (e.g., approximately 400 nm-122 nm) portions of the electromagnetic spectrum. The particular wavelengths are exemplary and not meant to be limiting. Other wavelengths of electromagnetic energy may be employed. In some cases, the illumination source 432 wavelength may be any one of 830 nm or 840 nm or 850 nm or 940 nm.

According to one embodiment, the ToF imaging device 420 may be a Continuous Wave Modulation (CWM) ToF imaging device. The ToF imaging device 420 may include a transducer or sensor 426 such as a CMOS or CCD sensors. For example, the sensor may include a two-dimensional array of photo-sensitive or photo-responsive elements, for instance a two-dimensional array of photodiodes or a two-dimensional array of charge coupled devices (wherein each pixel of the sensor 426 measures the time the light has taken to travel from the illumination unit 430 (to the object and back to the focal plane array). According to one embodiment, the ToF sensor 426 may be a VGA 640×480 pixels sensor used with an illumination source generating a beam of a wavelength of 950 nm, modulated at 75 MHz (creating a 2 m range), however other types of illumination sources and sensors in different ranges may be used. Modulation in accordance with embodiments, may relate to the sin wave oscillation in order to extract the phase of the modulation and hence depth data.

The ToF imaging device 420 includes an optical unit 422 comprising one or more lens for gathering the reflected light and images from the scene onto the sensor 426. In some cases, the optical unit 422 may further include one or more optical band-pass filter, for example for passing only the light with the same wavelength as the illumination source.

The ToF imaging device 420 may optionally include a buffer communicatively coupled to the sensor 126 to receive image data measured, captured or otherwise sensed or acquired by the sensor 126. The buffer may temporarily store image data until the image data is processed.

According to embodiments, each pixel of the sensor 426 is configured to perform more than one measurement, typically four different measurements, at different time intervals at each frame for estimating the four values of the cross-correlation signal, for example, according to the 4-Bucket method as illustrated above.

FIG. 5 illustrates a flowchart 500 of one embodiment of a method for detecting micro-vibrations of one or more objects in a scene using a single ToF imaging device. In other embodiments, the method includes different or additional steps than those described in conjunction with FIG. 5. Additionally, in various embodiments, steps of the method may be performed in different orders than the order described in conjunction with FIG. 5.

At step 510 modulated and structured light including a light pattern such as a specific light pattern is projected into the scene, for example by the illumination source 432 of the ToF imaging device 420.

In various embodiments, the projected light pattern may be a pattern of spots that for example uniformly cover the scene or selective portions of the scene. Other patterns such as lines are possible as well. Other patterns such as a dot, a line, a shape and/or a combination thereof may be projected on the scene.

In some cases, each reflected light pattern (e.g. spot) is covered by one or more of the ToF sensor pixels. For example, each spot may be covered by more or less than 5×5, 4×4, 3×3 pixels.

At step 520 one or more images of the scene captured by the ToF sensor 426 are received, for example at the processor 452. The captured images include the modulated and the structured light pattern reflected (e.g., the "reflected light pattern" such as the spots) by the one or more objects of interest (and reflected by other objects). Additionally, the received images include a resulted speckle pattern for each reflected light pattern (e.g. spot), originating from the interference of the micro structure of the illuminated one or more objects and/or from the movement of the objects.

It is stressed that although the modulation of the projected light may somewhat reduce the speckle contrast, due to inducing some wavelength shift there are enough reflected speckles contrast to allow micro-vibration analysis as will be illustrated below.

At step 530 the light pattern reflected (i.e., the "reflected light pattern") by the one or more objects of interest (and reflected by other objects) are analyzed by the processor to yield depth data and more specifically to extract the phase φ for measuring the distance and the reflection coefficient A (i.e. amplitude) of the received signal (which depends on the object's reflectivity and of the sensor's sensitivity) to obtain the intensity of the reflected speckle pattern. Specifically, the phase is measured according to the relationship between phase shift and distance x:

$$\varphi = 2\pi f x/c$$

where f is the modulation frequency

At step 540 the measured reflection coefficient images including the reflected light pattern as obtained by the ToF sensor are used to analyze changes in one or more speckles pattern structure over time formed at each spot to identify one or more micro-vibrations of the one or more objects.

For example, one or more changes in one or more speckle patterns of at least one of the reflections of the structured light pattern are analyzed in at least some consecutive images of the plurality of images to identify the vibrations of the at least one object based on said speckle pattern analysis and said depth data.

According to some embodiments, the identified micro-vibrations may be used for various applications and systems.

For example, at step 550 the identified micro-vibrations and the depth data allow rapid and direct finding of the one or more object classification (class) of the object(s) detected in the scene and/or the attribute(s) (e.g. motion, gesture, facial expression, bodily positioning, limb positioning, size, shape, etc.), and/or motion of the object(s).

It is stressed that the particulars shown hereinabove are by way of example and for purposes of illustrative discussion of the preferred embodiments of the present invention only, and are presented in the cause of providing what is believed to be the most useful and readily understood description of the principles and conceptual aspects of the invention.

According to some embodiments, the identification of one or more micro-vibrations of step 550 may include, for example, respiration, an eye movement, an eyelid movement, a subtle limb (e.g. hand, leg) movement, a subtle head movement and/or the like by analyzing at least some of the captured images comprising the measured ambient light (B) and the structured light (e.g. spots) to detect changes to a speckle pattern of one or more of the diffused light elements of the structured light pattern reflected back from the object(s) present in the scene 405. The changes to the speckle pattern may be indicative of micro-vibrations, i.e. very small and subtle movements that may be too minor to be detected by analyzing variations in the depth data extracted from the captured images.

In further embodiments, the processing unit may be a digital processing device including one or more hardware central processing units (CPU) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

In some embodiments, the system disclosed herein includes one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device.

In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media. In some embodiments, the system disclosed herein includes at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof. In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, the system disclosed herein includes software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the system disclosed herein includes one or more databases, or use of the same. In view of the disclosure provided herein, those of skill in the art will recognize that many databases are suitable for storage and retrieval of information as described herein. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included. Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described. Methods of the present invention may be implemented by performing or completing manually, automatically, or a combination thereof, selected steps or tasks.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for detecting vibrations, of one or more objects in a scene, the system comprising:

at least one external illumination source configured to project coherent light in a structured light pattern with a plurality of light spots on the scene;

a Time-of-Flight (ToF) imaging device spaced from the at least one external illumination source comprising:

an illumination source configured to project modulated light into the scene;

a TOF sensor, said TOF sensor is configured to:

capture a plurality of images, said plurality of images comprising reflections of said modulated light and said structured light pattern from the one or more objects in the scene, and ambient light images of one or more objects in the scene; and at least one processor configured to:

map each of one or more speckle patterns of the plurality of light spots with a plurality of pixels;

extract depth data of said one or more objects by analyzing reflections of the modulated light in the plurality of images;

analyze one or more changes in one or more speckle patterns of at least one of the reflections of said structured light pattern in at least some consecutive images of the plurality of images by averaging the one or more changes in at least two of the plurality of pixels; and identify the vibrations of the one or more objects based on said speckle pattern analysis and said depth data.

2. The system of claim 1, wherein said depth data is extracted by measuring the phase difference between the projected and reflected modulated light and further analyze the plurality of images to extract said ambient illumination images of said scene and wherein said ambient illumination images are used to analyze one or more changes in the speckle pattern of at least one of the plurality of reflected diffused light elements in at least some consecutive images of the plurality of images.

3. The system of claim 1, wherein said depth data, ambient light images and said detected vibrations are obtained and detected simultaneously in the same images by the TOF sensor, resulting in said depth data, said ambient light images and said detected vibrations being in the same coordinate system.

4. The system of claim 3, further including utilizing the coordinate system to correlate the vibrations with the one or more objects.

5. The system of claim 1, wherein the at least one processor is configured to:

detect and classify one of the one or more objects based on at least one of the extracted depth data or the ambient light images; and based on the classification, map each of the one or more speckle patterns of the plurality of light spots reflected from the classified object with the plurality of pixels to assign an attribute to the classified object.

6. The system of claim 1, wherein the one or more changes to the speckle patterns includes a lateral translation which is indicative of a tilt of the speckle pattern with respect to the TOF sensor.

7. The system of claim 6, wherein an angular velocity is derived from analysis of the lateral translation from at least some of the plurality of images that are consecutively captured.

8. The system of claim 1, wherein the processor is further configured to: classify or identify attributes of the one or more objects based on said identified at least one micro-vibration.

9. The system of claim 1, wherein the processor is further configured to: derive, from the depth data, a classification of at least one or more objects present in the scene by assigning a probability score to one or more class labels.

10. The system of claim 9, wherein the visual analysis comprises using edge detection.

11. The system of claim 1, wherein the processor is configured to:

detect and classify a human based on at least one of the extracted depth data or the ambient light images; and based on the classification, map each of the one or more speckle patterns of the plurality of light spots reflected from the human with the plurality of pixels to assign a physical attribute to the human, wherein the physical attribute is associated with safely operating a vehicle.

12. The system of claim 1, wherein the at least one processor is configured to apply an offset coefficient due to ambient illumination during the speckle content analysis.

13. The system of claim 1, wherein said ToF sensor includes a photodiode or photodiode array and each speckle pattern is mapped to 1-100 pixels of said ToF sensor and the averaging of the one or more changes in at least two of the plurality of pixels, includes averaging at least two adjacent pixels.

14. The system of claim 1, configured for mounting inside a vehicle.

15. A system for detecting vibrations of one or more objects in a scene, the system comprising:

at least one external illumination source configured to project light in a structured light pattern with a plurality of light spots on the scene;

a Time-of-Flight (ToF) imaging device spaced from the at least one external illumination source comprising:

an illumination source configured to project modulated light into the scene;

a ToF sensor, said ToF sensor is configured to:

capture a plurality of images, said plurality of images comprising reflections of said modulated and structured light pattern from one or more objects in the scene; and at least one processor configured to:

extract depth data of said one or more objects by analyzing the plurality of images;

analyze one or more changes in two or more adjacent speckle patterns of the reflections of at least two of the light spots in at least some conservative images of the plurality of images by averaging illumination intensity of the adjacent speckle patterns in the at least two of the light spots;

applying temporal filtering over the averaged illumination intensity; and identify the vibrations of the at least one object based on said speckle pattern analysis and said depth data.

16. The system of claim 15, wherein said depth data is extracted by measuring the phase difference between the projected modulated and structured light pattern and further analyze the plurality of images to extract an ambient illumination image of said scene and wherein said ambient illumination image is used to determine an offset coefficient due to the ambient illumination to analyze one or more changes in the speckle pattern of at least one of the plurality of reflected diffused light elements in at least some consecutive images of the plurality of images.

17. The system of claim 16, wherein the at least one processor is configured to:

measure the phase and amplitude of the reflected modulated and structured light pattern to yield the illumination intensity of said two or more speckle patterns;

analyze the phase to extract depth information data of the scene; and analyze, on said measured illumination intensity, the one or more changes in the speckle pattern of at least one of the plurality of reflected diffused light elements in at least some consecutive images of the plurality of images;

identify at least one micro-vibration of the one or more objects based on said speckle pattern analysis and said measured illumination intensity.

18. The system of claim 17, wherein the processor is further configured to: classify or identify attributes of the one or more objects based on said identified at least one micro-vibration.

19. The system of claim 17, wherein the processor is further configured to: classify the least one or more objects presented in the scene by visually analyzing at least one image of the plurality of images.

20. The system of claim 19, wherein the visual analysis comprises using at least one trained machine learning model for classifying the one or more at least one objects, wherein the machine learning model includes a neural network that includes an input layer to receive the plurality of images, a first convolutional layer, a first pooling layer, a second convolutional layer, a second pooling layer, a third convolutional layer, a first fully connected layer, a second fully connected layer, a SOFTMAX loss layer, and an output layer outputting the classification.

* * * * *